A. G. AHLGREN.
CLUTCH.
APPLICATION FILED JUNE 10, 1918.

1,287,811. Patented Dec. 17, 1918.

INVENTOR
Axel G. Ahlgren
BY
ATTORNEY

UNITED STATES PATENT OFFICE.

AXEL G. AHLGREN, OF BRIDGEPORT, CONNECTICUT.

CLUTCH.

1,287,811.  Specification of Letters Patent.  Patented Dec. 17, 1918.

Application filed June 10, 1918. Serial No. 239,245.

*To all whom it may concern:*

Be it known that I, AXEL G. AHLGREN, a citizen of the United States, residing at Bridgeport, county of Fairfield, State of Connecticut, have invented an Improvement in Clutches, of which the following is a specification.

This invention relates to clutches adapted for general use, as upon marine and automobile engines, and has for its object to provide clutch mechanism which shall be relatively simple and inexpensive to produce, as it consists of but few parts, which shall be quick acting and have a powerful grip owing to its novel construction which gives great leverage, and which shall be practically fool proof and impossible to get out of repair.

With these and other objects in view, I have devised the novel mechanism which I will now describe referring to the accompanying drawing forming a part of this specification and using reference characters to indicate the several parts.

Figure 1:
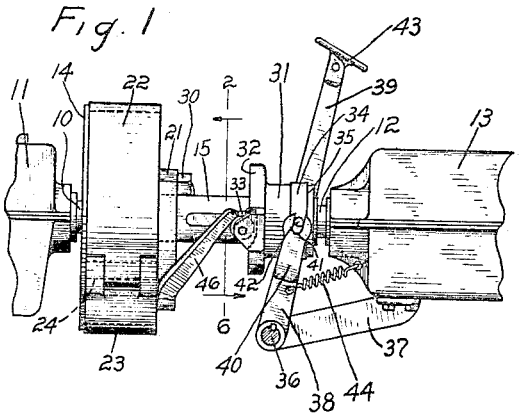
Figure 1 is an elevation illustrating my novel clutch mechanism applied to an automobile or marine engine, the parts being in the normal or gripping position.
Figure 3:
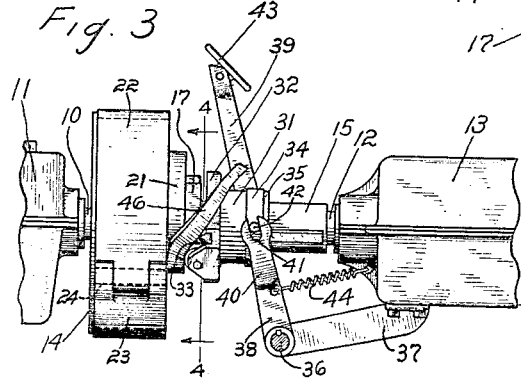
Figures 4, 7:
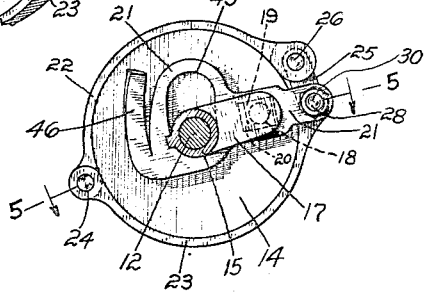
Figure 5:
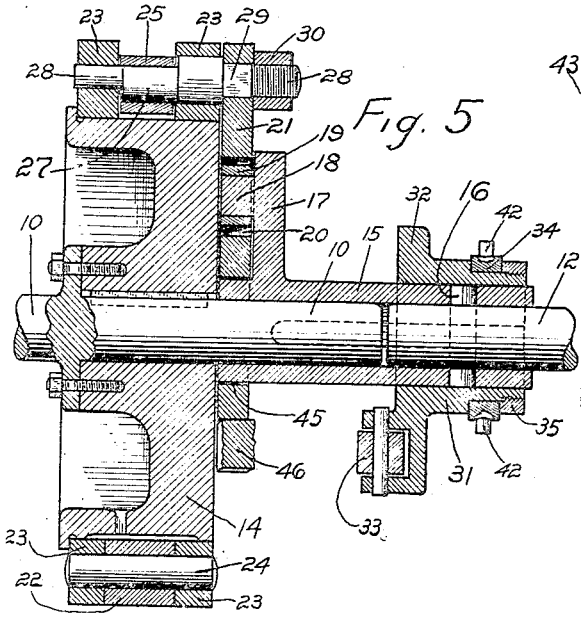
Figure 6:
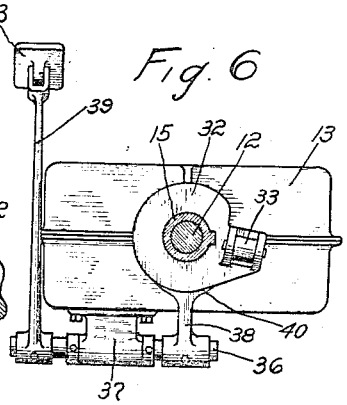

Fig. 3 a view similar to Fig. 1, but showing the parts in the releasing position;

Fig. 4 a section on the line 4—4 in Fig. 3, looking in the direction of the arrows;

Fig. 5 a section on an enlarged scale on the line 5—5 in Fig. 4, looking in the direction of the arrows;

Fig. 6 a section on the line 2—6 in Fig. 1, looking in the direction of the lower arrow, and Fig. 7 is a detail perspective view illustrating a modified form in which the link is dispensed with.

10 denotes the driving shaft, in the present instance a crank shaft, 11 the crank case, 12 the driven shaft, in the present instance a transmission shaft, 13 the transmission case, and 14 a fly wheel carried by the driving shaft, these parts being of ordinary construction. The driven shaft carries a sleeve 15 into which the rear end of the driving shaft extends, and which is rigidly secured to the driven shaft, as by a pin 16. This sleeve comprises an arm 17 carrying a stud 18 on which an angular block 19 is pivoted. This block has a slight reciprocatory movement in a rectangular slot 20 in an operating lever 21. 22 and 23 denote the members of a two-part metallic clutch band which inclose the fly wheel and are hinged together, as at 24. A one piece clutch band may of course be used if preferred. 25 denotes a link, one end of which is pivoted to member 22 of the clutch band, as at 26, the other end of said link being pivoted on an eccentric 27 forming part of shaft 28 on which member 23 of the clutch band is also pivoted, see Fig. 5. Shaft 28 is also provided with an angular portion 29, which passes through and has rigid connection with lever 21, the parts being retained in place by a nut 30, having threaded engagement with the end of the shaft. 31 denotes a sleeve which is adapted to slide on sleeve 15, is keyed thereto to prevent independent rotation, and is provided with a flange 32 on which a roller 33 is pivoted. 34 denotes a yoke ring mounted on the sliding sleeve and within which said sleeve may rotate freely. The yoke ring is shown as retained in place by a ring nut 35. 36 denotes a shaft mounted to oscillate in a bracket 37, shown as bolted to the transmission case. This shaft carries a yoke lever 38 and a pedal lever 39. 40 denotes a yoke carried by lever 38, the arms of which are provided with slots 41, engaged by pins 42, which project from opposite sides of the yoke ring. 43 denotes a pedal at the upper end of lever 39. A spring 44, the ends of which are connected to the yoke lever and to the transmission case, acts to normally retain the pedal lever and sliding sleeve in the normal or operative position, as in Fig. 1.

Lever 21 is provided with an enlargement in which is a transverse slot 45, through which sleeve 15 passes, and with an oblique arm 46 having a cam surface which is engaged by the roller on the sliding sleeve. The ends of slot 45, by contact with sleeve 15, limit the movements of the oblique arm and prevent the possibility of the arm passing out of engagement with the roller.

Figure 2:
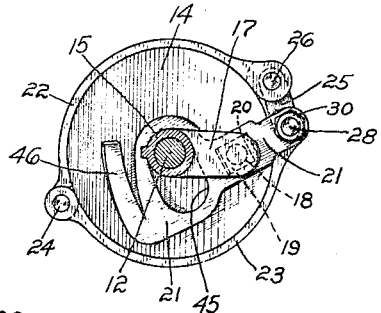
Fig. 2 is a section on the line 2—6 in Fig. 1, looking in the direction of the upper arrow.

The operation is as follows: In the position shown in Fig. 1, spring 44 is holding the pedal lever in its normal or operative position and the driven shaft is connected with the driving shaft. Suppose now that the mechanism is applied to an automobile engine, that the engine is running and that the operator desires to stop the car quickly or to change gears (it being understood of course that the gear changing mechanism forms no portion of the present invention, and is therefore not illustrated.) The operator would swing the pedal lever from the position shown in Fig. 1 to the position shown in Fig. 3. This movement carries sleeve 31 forward (toward the left as seen in the drawing) and forces roller 33 against the oblique arm, which extends from operating lever 21, and causes said arm to ride up over the roller. The effect is to swing the operating lever from the position shown in Fig. 2 to that shown in Fig. 4 and impart an oscillatory movement to shaft 28, carrying eccentric 27. The action of the eccentric exerted on member 23 of the clutch band is to swing said member outward slightly from the fly wheel and, in coöperation with the link, which swings the other member of the band outward, to release the grip of both members on the fly wheel, so that the fly wheel will rotate within the clutch band and thus leave the driving shaft and the driven shaft disconnected.

The instant the operator releases the pedal lever, spring 44 will return the pedal lever and sliding sleeve 31 to the position shown in Fig. 1. The slight friction and the weight of the clutch band upon the fly wheel will now cause the fly wheel to pick up the clutch band and carry it forward. This forward movement of the clutch band and the frictional resistance of the driven shaft, which carries sleeve 15 and arm 17, will change the parts relatively to each other from the position shown in Fig. 4 to that shown in Fig. 2. It being understood that at the beginning of the connecting movement the driven shaft and arm 17 are stationary, it follows that operating lever 21 and angular block 19 must rock on stud 18 as a fulcrum, this causes oscillation of shaft 28 carrying eccentric 27, which in turn acts, in coöperation with link 25, to cause the clutch band to grip the fly wheel and thus connect the driven shaft to the driving shaft.

In the modified form illustrated in Fig. 7, the link is dispensed with, member 23 of the clutch band is pivoted on shaft 28, as before, and member 22 of the clutch band is provided with an ear 47 which is pivoted directly on the eccentric. This modification will be obvious from Fig. 5 by merely substituting ear 47 for link 25.

Having thus described my invention, I claim:

1. A clutch comprising a fly wheel, an inclosing clutch band, a shaft mounted to oscillate in one end of the band, an eccentric carried by the shaft to which the other end of the band is connected, a lever rigidly secured to the shaft and having an arm and an angular slot, another arm, a block pivoted on the last mentioned arm and lying in the slot, and means for actuating the first mentioned arm, whereby the lever is rocked on the pivot of the block and the clutch band caused to grip or release the fly wheel.

2. A clutch comprising a fly wheel, an inclosing clutch band, a shaft mounted to oscillate in one end of the band, an eccentric carried by the shaft to which the other end of the band is connected, a lever rigidly secured to the shaft and having an oblique arm and an angular slot, a sleeve having an arm provided with a stud, a block pivoted on the stud and lying in the slot, and a sliding sleeve adapted to actuate the oblique arm.

3. A clutch comprising a driving shaft, a fly wheel carried thereby, a driven shaft, a clutch band inclosing the fly wheel, a shaft mounted to oscillate in one end of the band, an eccentric carried by the shaft to which the other end of the band is connected, a lever by which the shaft and eccentric are oscillated and which is provided with an angular slot, an arm extending from the driven shaft, an angular block pivoted on the arm and lying in the slot, and means for actuating the lever, whereby the band is caused to grip or release the fly wheel.

4. A clutch comprising a driving shaft, a fly wheel carried thereby, a driven shaft, a clutch band inclosing the fly wheel, a shaft mounted to oscillate in one end of the band, an eccentric carried by the shaft to which the other end of the band is connected, a lever by which the shaft and eccentric are oscillated and which is provided with an angular slot and a transverse slot, a sleeve passing through the transverse slot and having an arm extending therefrom, said sleeve being secured to the driven shaft and receiving the driving shaft which may rotate therein, an angular block pivoted on the arm and lying in the angular slot, and means for actuating the lever to cause the band to grip or release the fly wheel.

5. A clutch comprising a fly wheel, an inclosing clutch band, a shaft mounted to oscillate in one end of the band and having an eccentric, a link pivoted on the eccentric and to the other end of the band, a lever rigidly secured to the shaft and having an arm and an angular slot, another arm, a block pivoted on the last mentioned arm and lying in the slot, and means for actuating the first mentioned arm, whereby the lever is rocked on the pivot of the block and the clutch band is caused to grip or release the fly wheel.

6. A clutch comprising a fly wheel, an inclosing clutch band, a shaft mounted to oscillate in one end of the band and having an eccentric, a link pivoted on the eccentric and to the other end of the band, a lever rigidly secured to the shaft and having an oblique arm and an angular slot, a sleeve having an arm provided with a stud, a block pivoted on the stud and lying in the slot, and a sliding sleeve adapted to actuate the oblique arm.

7. A clutch comprising a driving shaft, a fly wheel carried thereby, a driven shaft, a clutch band inclosing the fly wheel, a shaft mounted to oscillate in one end of the band and having an eccentric, a link pivoted on the eccentric and to the other end of the band, a lever by which the shaft and the eccentric are operated and which is provided with an angular slot, an arm extending from the driven shaft, an angular block pivoted on the arm and lying in the slot, and means for actuating the lever, whereby the band is caused to grip or release the fly wheel.

8. A clutch comprising a driving shaft, a fly wheel carried thereby, a driven shaft, a clutch band inclosing the fly wheel, a shaft mounted to oscillate in one end of the band and having an eccentric, a link pivoted on the eccentric and to the other end of the band, a lever by which the shaft and eccentric are oscillated and which is provided with an angular slot and a transverse slot, a sleeve passing through the transverse slot and having an arm extending therefrom, said sleeve being secured to the driven shaft and receiving the driving shaft which may rotate therein, an angular block pivoted on the arm and lying in the angular slot, and means for actuating the lever to cause the band to grip or release the fly wheel.

9. A clutch comprising driving means, driven means, a clutch band carried by the driven means and inclosing the driving means, a shaft on which one end of the clutch band is pivoted and which is provided with an eccentric, a link pivoted on the eccentric and to the other end of the band, a lever by which the shaft and eccentric are oscillated, and which is provided with a slot, an arm extending from the driven means, an angular block pivoted on the arm and lying in the slot, and means acting on the lever whereby the band is caused to grip or release the driving means.

10. In combination, a fly wheel, an inclosing clutch band, a shaft mounted to oscillate in one end of the band and having an eccentric, a link pivoted on the eccentric and to the other end of the band, a lever rigidly secured to the shaft and having an oblique arm and a slot, another arm, a block pivoted to the last mentioned arm and lying in the slot, and a sliding sleeve adapted to actuate the oblique arm, whereby the lever is rocked on the pivot of the block and the clutch band caused to grip or release the fly wheel.

11. A clutch comprising driving means, a clutch band inclosing said driving means, a shaft mounted to oscillate in one end of the band, an eccentric on the shaft to which the other end of the band is connected, a lever secured to said shaft and having an oblique arm, a sliding sleeve having a roller adapted to engage said arm, and means for reciprocating said sleeve to control the action of the clutch band.

12. A clutch comprising driving means, a clutch band inclosing said driving means, a shaft mounted to oscillate in one end of the band, an eccentric on the shaft to which the other end of the band is connected, a lever secured to said shaft and having an arm and an angular slot, another arm, a block pivoted on the last mentioned arm and lying in the slot, and means for actuating the first mentioned arm, whereby the lever is rocked on the pivot of the block and the clutch band caused to grip or release the fly wheel.

13. A clutch comprising driving means, a clutch band inclosing said driving means, a shaft mounted to oscillate in one end of the band, an eccentric on the shaft to which the other end of the band is connected, a lever secured to said shaft and having an oblique arm and an angular slot, a sleeve having an arm provided with a stud, a block pivoted on the stud and lying in the slot, and a sliding sleeve adapted to actuate the oblique arm.

In testimony whereof I affix my signature.

AXEL G. AHLGREN.